US012279927B1

(12) United States Patent
Bajunaid

(10) Patent No.: US 12,279,927 B1
(45) Date of Patent: Apr. 22, 2025

(54) DENTAL APPARATUS FOR HOLDING TWO SEPARATED PIECES OF ARTICULATING PAPER AND A METHOD OF USING THE SAME

(71) Applicant: KING SAUD UNIVERSITY, Riyadh (SA)

(72) Inventor: Salwa Omar Bajunaid, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 18/663,408

(22) Filed: May 14, 2024

(51) Int. Cl.
*A61C 8/00* (2006.01)
*A61C 5/77* (2017.01)

(52) U.S. Cl.
CPC .............. *A61C 8/0048* (2013.01); *A61C 5/77* (2017.02)

(58) Field of Classification Search
CPC ....... A61C 19/05; A61C 19/052; A61C 19/04; A61C 19/00; A61C 19/001; A61C 8/0048; A61C 5/77; B23K 3/087
USPC ............................................. 433/167; 269/45
See application file for complete search history.

(56) References Cited

U.S. PATENT DOCUMENTS

| | | | | |
|---|---|---|---|---|
| 459,637 A | * | 9/1891 | Lee | B25B 5/006 269/45 |
| 546,421 A | * | 9/1895 | Duke | B25B 1/20 269/45 |
| 1,518,021 A | * | 12/1924 | Truxillo | A61C 3/06 132/323 |
| 3,035,582 A | * | 5/1962 | Harry | A61B 17/28 600/218 |
| 3,883,128 A | * | 5/1975 | Breese | B25B 5/006 269/45 |
| 4,340,369 A | * | 7/1982 | Steiner | A61C 9/00 606/210 |
| 5,181,849 A | * | 1/1993 | Callne | A61C 19/05 433/153 |
| 5,599,183 A | * | 2/1997 | Razdolsky | A61B 17/663 269/45 |
| 6,095,815 A | * | 8/2000 | Mueller | A61C 19/04 606/205 |
| 6,431,864 B1 | * | 8/2002 | Silverstein | A61C 3/10 433/159 |
| 6,896,249 B1 | * | 5/2005 | Ferrara | B25B 1/12 269/45 |

(Continued)

*Primary Examiner* — Matthew M Nelson
(74) *Attorney, Agent, or Firm* — Nath, Goldberg & Meyer; Joshua B. Goldberg

(57) ABSTRACT

A dental apparatus includes a central component. The central component includes an elongated member having a first end, a second end, and a body extending between the first and second ends thereof. The dental apparatus also includes a first holding assembly movably coupled to the body of the elongated member and a second holding assembly movably coupled to the body of the elongated member. Each one of the first and second holding assemblies is configured to releasably hold dental articulating paper. The dental apparatus, loaded with two pieces of articulating paper that are separated from one another by a certain distance, can be moved via one hand to position the two pieces of articulating paper between two adjacent teeth to assist the dentist in determining the fit of a prosthetic crown that will be cemented over a prepared natural tooth or over an implant.

14 Claims, 6 Drawing Sheets

(56) References Cited

U.S. PATENT DOCUMENTS

| | | | | |
|---|---|---|---|---|
| 8,020,840 | B2* | 9/2011 | Hall, Jr | B25B 5/163 |
| | | | | 81/421 |
| 2003/0020224 | A1* | 1/2003 | Murvine | B25B 11/00 |
| | | | | 269/45 |
| 2008/0138771 | A1* | 6/2008 | Knutson | A61C 19/05 |
| | | | | 433/223 |
| 2011/0151406 | A1* | 6/2011 | Solano | A61C 19/05 |
| | | | | 433/162 |
| 2015/0209939 | A1* | 7/2015 | Chi-Fu | B25B 5/003 |
| | | | | 269/45 |
| 2018/0050407 | A1* | 2/2018 | Richards | H01R 43/0263 |
| 2018/0064518 | A1* | 3/2018 | Sutera, III | A61C 5/80 |
| 2020/0093583 | A1* | 3/2020 | Yamaguchi | A61C 11/003 |
| 2022/0160532 | A1* | 5/2022 | Da Cruz | A61C 19/045 |
| 2024/0351818 | A1* | 10/2024 | Berdan | B65H 35/002 |

* cited by examiner

DENTAL APPARATUS FOR HOLDING TWO SEPARATED PIECES OF ARTICULATING PAPER AND A METHOD OF USING THE SAME

TECHNICAL FIELD

The present disclosure relates to dentistry, and more particularly, to a dental apparatus configured to hold two separated pieces of articulating paper and a method of using the same.

DISCUSSION OF THE RELATED ART

The usage of articulating paper in dentistry is well known. Articulating paper is generally used to determine whether the height of a prosthetic tooth, for example, a dental crown that is to be installed in a patient's mouth, is proper. In this case, the articulating paper is placed in between the newly fabricated artificial crown to be installed (the crown is put in place but not cemented to the prepared natural tooth) and the opposing tooth (located above or below the crown). The patient is asked to bite and/or tap his/her teeth. This biting/tapping action causes the crown and the opposing tooth to crush/compress the articulating paper.

The crushing/compression action causes the articulating paper to leave a colored mark on the crown and/or the opposing tooth. The colored mark indicates a high spot or high occlusion on the crown. The marked area can then be ground down to the correct height by a dentist.

However, no devices are known to exist for holding articulating paper in the interproximal contact areas between the prosthetic crown and its adjacent teeth.

SUMMARY

The present disclosure relates to a dental apparatus configured to simultaneously hold two pieces of articulating paper at a certain distance away from one another. The apparatus may be configured to hold (or align) the pieces of the articulating paper approximately in parallel to one another (when the papers stay straight) and to keep the articulating papers spaced apart from one another by a certain distance.

The dental apparatus with the two pieces of articulating paper releasably connected thereto is configured to be inserted in a patient's mouth, and more precisely, to hold the two articulating papers at a distance from one another such that the articulating papers can be inserted between teeth in the patient's jaw where a new dental crown will be installed. The dental apparatus will be held in a way that places one of the articulating papers against the tooth located in front of the crown (which is not yet installed in the gap), and the other articulating paper against the tooth located behind the crown.

In medical terms, the articulating papers will be placed at the interproximal contact areas between the prosthetic crown and the adjacent teeth. After placing the apparatus holding the two articulating papers in the patient's mouth as described, the dentist can then place the crown on the receiving tooth base (without cementing the crown to the base) in order to check the fit of the crown at both interproximal contact areas.

If the contact between the new crown and the adjacent teeth is tighter than necessary, the crown will crush/compress one or both articulating papers at the interproximal contact areas between the prosthetic crown and the adjacent teeth. The crushing/compression action will mark the interproximal contact area(s) of the crown and/or the tooth. The dentist will observe the marking(s) and adjust accordingly.

The apparatus of the present disclosure is particularly useful in that it enables a one-hand operation for placing two pieces of articulating paper at the same time in the patient's mouth (i.e., one articulating paper at the interproximal contact area between a crown and the tooth in front of the crown and another articulating paper at the interproximal contact area between the crown and the tooth behind the crown). This is so because: a) the apparatus is configured to hold two pieces of articulating paper at the same time and to keep the papers separated from one another by the correct distance such that each articulating paper can be placed at the interproximal contact areas between the prosthetic crown and the adjacent teeth, and b) the apparatus can be held by using one hand.

This configuration is advantageous because it frees up one of the hands of the dentist during the procedure of checking the crown's fit. This, in turn, enables the dentist to use the free hand to, for example, reach for the crown and put the crown in its place in the patient's mouth while the other hand is holding the apparatus with both pieces of articulating paper at the interproximal contact areas between the crown and the adjacent teeth.

The configuration of the apparatus of the present disclosure addresses the shortcomings of the current state of the art, in which one of the dentist's hands must be used to hold the crown (and to place the crown in situ in the patient's mouth) while the other hand holds one articulating paper at a time (with a conventional holding device) to check the fit of only one of the two interproximal contact areas at a time.

The process of checking the fit of one end (or one interproximal contact area) of the crown at a time is inefficient (i.e., takes a long time to complete), and may also provide less accurate fit results.

In addition, the apparatus of the present disclosure is configured to have both of its holding components (or gripping jaws, with each holding component or gripping jaw being configured to hold a piece of articulating paper) be movable along a length of the apparatus. This configuration enables the user to adjust the separation distance between the holding components (thereby adjusting the separation distance between the two articulating papers) as needed based on the length of the gap between the two teeth where the new crown will be installed.

BRIEF DESCRIPTION OF THE DRAWINGS

The above and other features of the present disclosure will become more apparent by describing in detail exemplary embodiments thereof in conjunction with the accompanying drawings, in which:

FIG. 2A is a top side view illustrating the dental apparatus of FIG. 1;

FIG. 2B is a bottom side view illustrating the dental apparatus of FIG. 1;

FIG. 2C is a right side view illustrating the dental apparatus of FIG. 1;

FIG. 2D is a left side view illustrating the dental apparatus of FIG. 1;

DETAILED DESCRIPTION OF THE EMBODIMENTS

Figure 1:
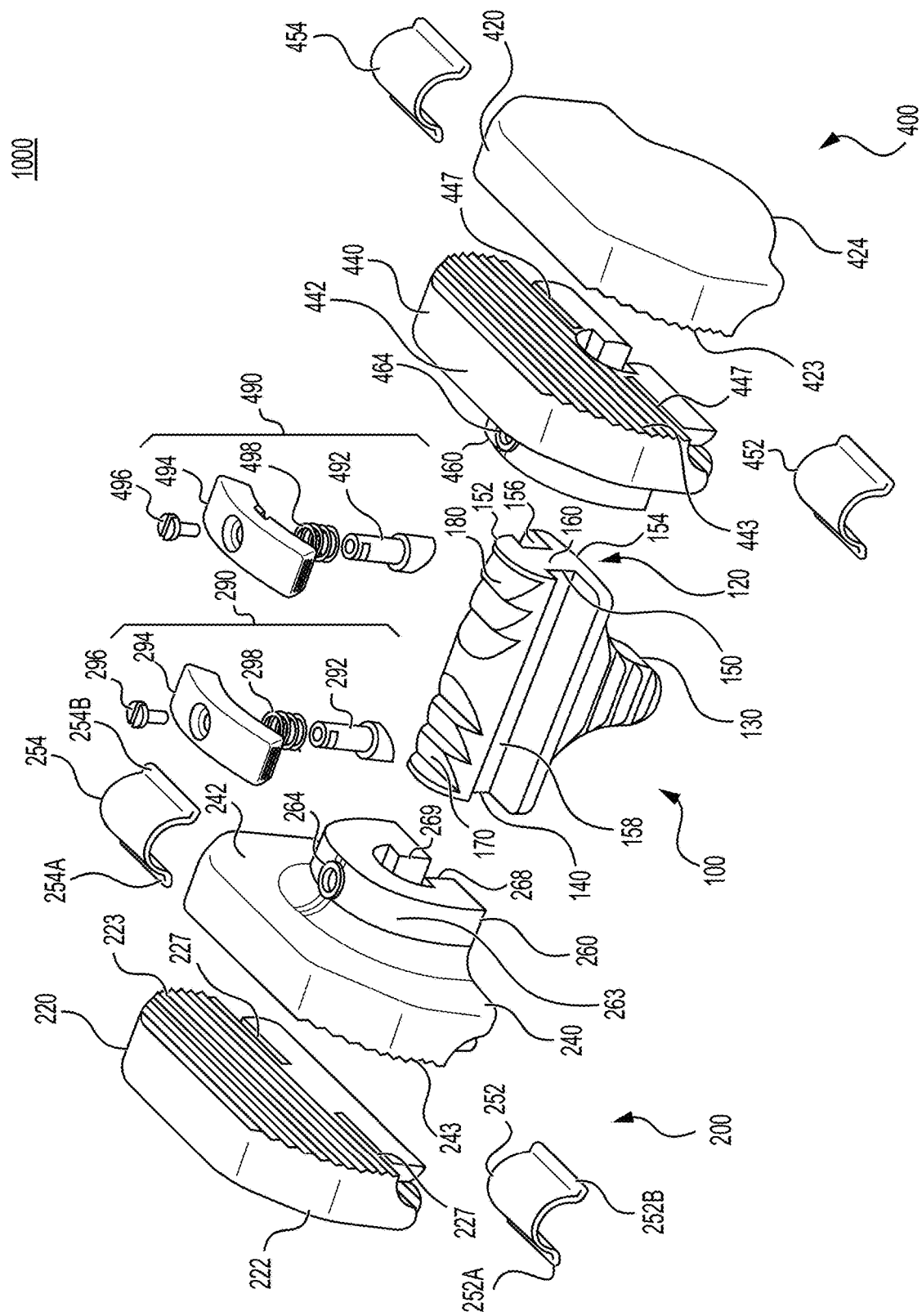
FIG. 1 is an exploded perspective view illustrating a dental apparatus of the present disclosure.

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

FIGS. 1-6 illustrate a dental apparatus 1000 according to the present disclosure.

Figure 2E:
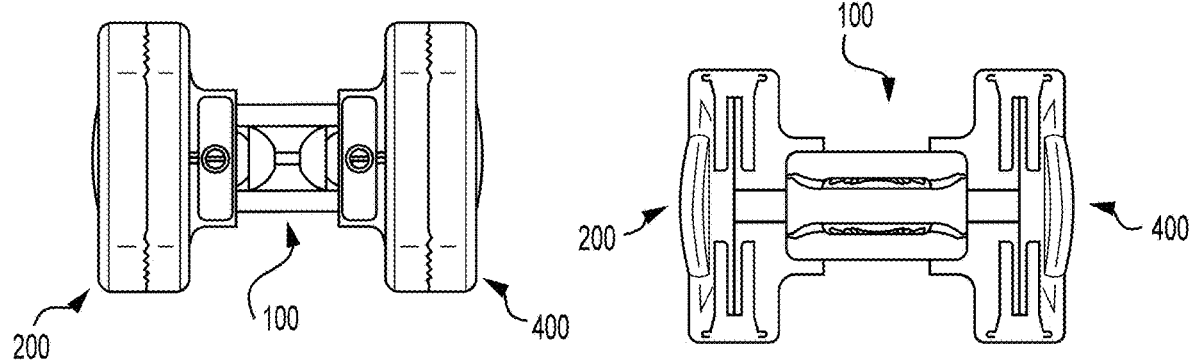
FIG. 2E is a front side view illustrating the dental apparatus of FIG. 1.
Figure 2E:
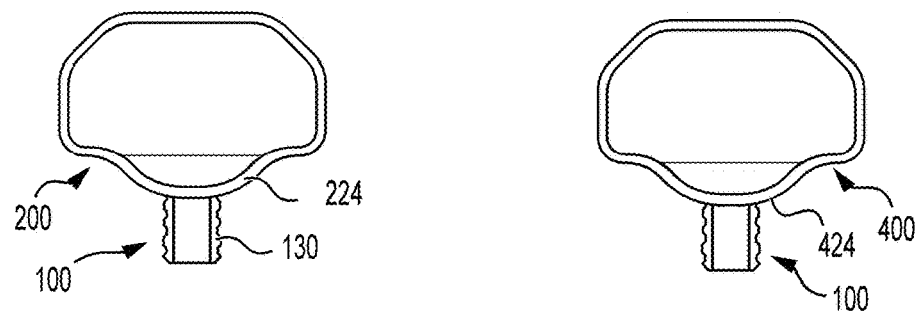
Figure 2E:
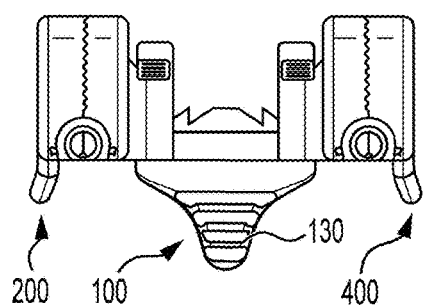

Referring to FIGS. 1 and 2E, the dental apparatus 1000 includes a central component 100, a first holding assembly 200 movably coupled to the central component 100 and a second holding assembly 400 movably coupled to the central component 100.

Referring to FIG. 1, the central component 100 may include an elongated structural member 120 (the elongated structural member 120 may be referred to as the "elongated member" 120 for brevity) and a third handle 130 connected to the elongated member 120.

Referring to FIG. 1, the elongated member 120 includes a first end 140, a second end 160, and a body extending between the first and second ends 140, 160. The body of the elongated member 120 may include a web 150 and first and second flanges 152, 154 disposed at opposite ends of the web 150.

The first flange 152 may be curved, as illustrated in FIG. 1. The web 150, with the first and second flanges 152, 154, defines first and second grooves 156, 158 that extend along a length of the body of the elongated member 120 on opposite sides of the web 150.

Referring to FIG. 1, the first flange 152 may include a first plurality of notches 170 sequentially arranged along a length of the body of the elongated member 120 (e.g., between the first and second ends 140, 160), and a second plurality of notches 180 sequentially arranged along the length of the body of the elongated member 120.

The first plurality of notches 170 may be disposed, for example, proximate to the first end 140 of the body of the elongated member 120 and distal to the second end 160 of the body of the elongated member 120. The first plurality of notches 170 may be, for example, V-shaped (or sawtooth-shaped, where the rise of each sawtooth may be perpendicular to the direction in which the first flange 152 extends, and the ramp of each sawtooth extends at an angle other than 90 degrees to the direction in which the first flange 152 extends, for example, at an acute angle or an obtuse angle relative to the direction in which the first flange 152 extends), and the opening (or open end) of the V-shape of each notch of the first plurality of notches 170 may be inclined in a direction away from the first end 140 of the body of the elongated member 120.

The second plurality of notches 180 may have a mirrored configuration relative to the first plurality of notches 170. For example, the second plurality of notches 180 may be disposed proximate to the second end 160 of the body of the elongated member 120 and distal to the first end 140 of the body of the elongated member 120. The second plurality of notches 180 may be, for example, V-shaped, and the opening of the V-shape in each notch of the second plurality of notches 180 may be inclined in a direction away from the second end 160 of the body of the elongated member 120. The first plurality of notches 170 may be spaced apart from the second plurality of notches 180 at opposite ends of the body of the elongated member 120. The first plurality of notches may extend on a different portion of the length of the body of the elongated member 120 than the second plurality of notches 180.

The elongated member 120 and the third handle 130 may be made of, for example, metal. The metal may include, for example, stainless steel (e.g., medical grade stainless steel), titanium, nickel, chromium, etc., or alloys thereof. The metal or alloy may feature, for example, high resistance to corrosion, oxidation and/or staining for ease of cleaning or sterilization (without corroding/staining/rusting due to the cleaning/sterilization and/or use) since the dental apparatus 1000 is contemplated to be used on humans for medical purposes. Alternatively, or in addition, each one of the elongated member 120 and the third handle 130 may include a polymeric material.

It is contemplated that the elongated member 120 and the third handle 130 are made of the same material or of different materials.

Referring to FIG. 1, the first holding assembly 200 may include a first holding component 220, a second holding component 240, first and second elastic members 252, 254 rotatably (or pivotally) coupling the first and second holding components 220, 240 to one another, and a first plunger assembly 290.

Figure 6:
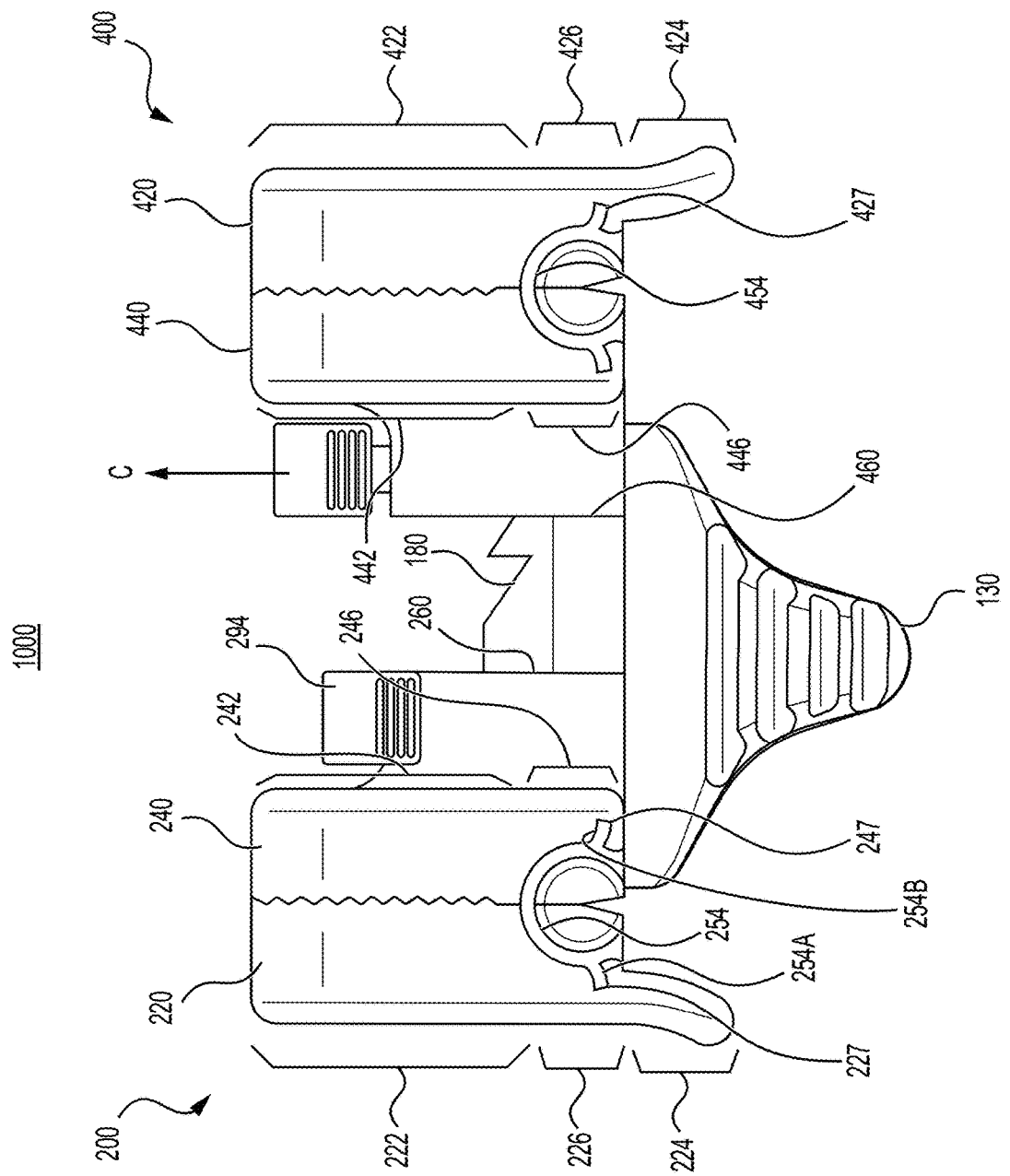
FIG. 6 is a front side view illustrating the dental apparatus of FIG. 1 in a closed state.

Referring to FIGS. 1 and 6, the first holding component 220 may include a first holding portion 222 having a first contact surface 223, a first handle 224 and a first coupling region 226 disposed between the first holding portion 222 and the first handle 224.

Referring to FIGS. 1 and 6, the second holding component 240 may include a second holding portion 242 having a second contact surface 243, a second coupling region 246 connected to the second holding portion 242, and a first protrusion 260 extending from the holding portion 242 and/or the second coupling region 246.

The first elastic member 252 may include a curved (or arcuate) body and first and second flanges 252A, 252B extending from opposite sides of the curved body. The second elastic member 254 may include a curved (or arcuate) body and first and second flanges 254A, 254B extending from opposite sides of the curved body.

The first coupling region 226 may include a first pair of elongated channels 227. Each one of the first pair of elongated channels 227 is configured to receive the first flange 252A or the first flange 254A inside to connect the first holding component 220 with the first and second elastic members 252, 254. For example, the first flange 252A of the first elastic member 252 can be slidably coupled to one of the first pair of elongated channels 227 (e.g., a bottom elongated channel), and the first flange 254A of the second elastic member 254 can be slidably coupled to the other one of the first pair of elongated channel 227 (e.g., a top elongated channel).

The second coupling region 246 may include a second pair of elongated channels 247 (one of the elongated channels 247 is visible in FIG. 6). Each one of the second pair of elongated channels 247 is configured to receive the second flange 252B or the second flange 254B inside to connect the second holding component 240 with the first and second elastic members 252, 254. For example, the second flange 252B of the first elastic member 252 can be slidably coupled to one of the second pair of elongated channels 247 (e.g., a bottom elongated channel), and the second flange 254B of the second elastic member 254 can be slidably coupled to the other one of the second pair of elongated channels 247 (e.g., a top elongated channel).

The first and second elastic members 252, 254 are configured to bias the first and second holding components 220, 240 toward one another (e.g., biasing the first and second contact surfaces 223, 243 toward one another) such that the first and second holding portions 222, 242 can be pressed toward one another. This configuration enables the first holding assembly 200 to be opened by pressing the first handle 224 toward the third handle 130 as illustrated by arrows B, B in FIG. 5A, or more generally, toward the second holding assembly 400 or in a direction toward second end 160 of the body of the elongated member 120, by a sufficient level of force to overcome the spring force of the first and second elastic members 252, 254 to separate the first and second holding portions 222, 224 from one another. See FIG. 5A illustrating the first holding assembly 200 in an open state, with the first and second holding portions 222, 242 of the first and second holding components 220, 240 being spaced apart from one another upon pressing the first handle 224 as indicated by the arrows B, B.

Figure 5A:
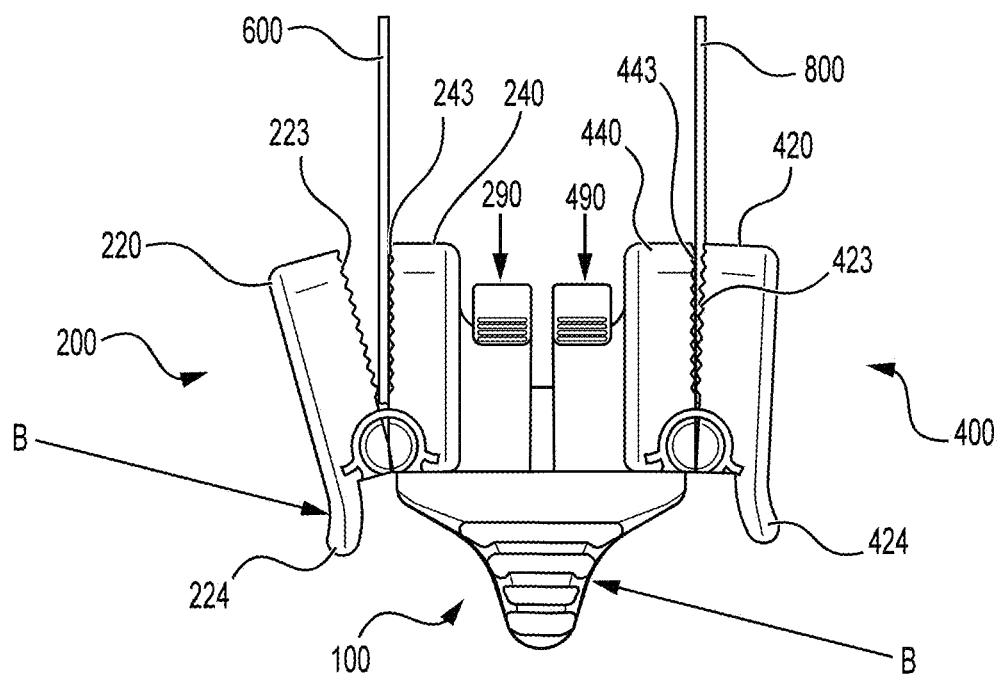
FIG. 5A is a front side view illustrating a holding assembly of the apparatus of FIG. 1 in an open state.
Figure 5B:
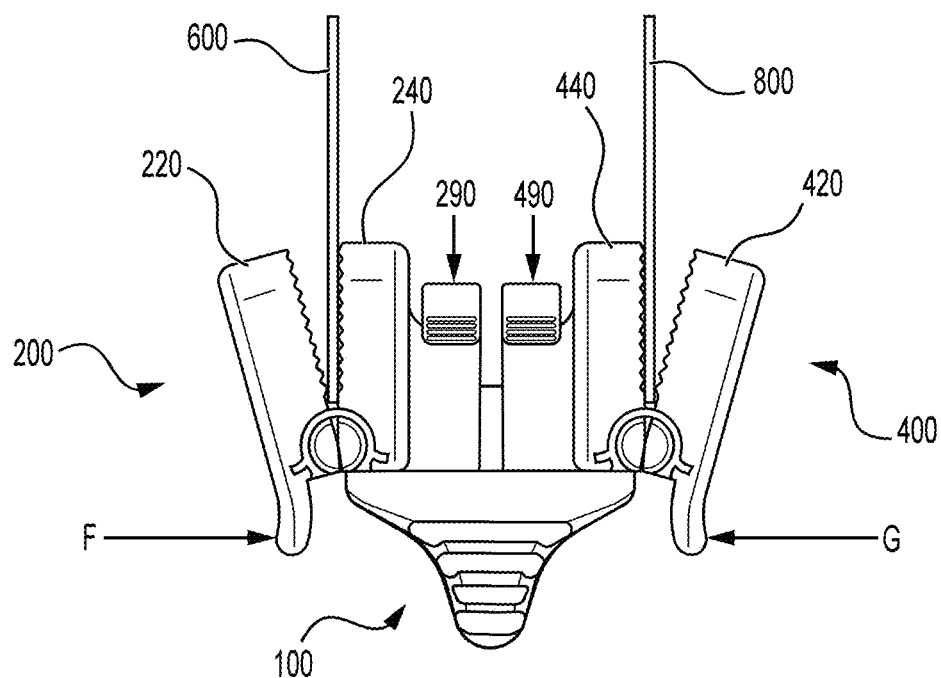
FIG. 5B is a front side view illustrating holding assemblies of the apparatus of FIG. 1 in an open state.

A user can insert a first piece of articulating paper 600 in between the first and second holding portions 222, 242 when the first holding assembly 200 is in the open state, as illustrated in FIG. 5A. The user can then release the force applied to the first handle in order to allow the spring force of the first and second elastic members 252, 254 to close the first holding assembly 200 and to secure the first piece of articulating paper 600 in between the first and second holding portions 222, 242. As illustrated in FIGS. 1 and 5A, the first contact surface 223 of the first holding portion 222 and the second contact surface 243 of the second holding portion 242 may each be grooved to provide a high level of friction (or grip) between the first holding assembly 200 and the first articulating paper 600 to secure the first articulating paper 600 between the first and second holding portions 222, 242.

The first protrusion 260 is movably coupled to the body of the elongated member 120. The first protrusion 260 enables the first holding assembly 200 to be moved along the body of the elongated member 120. The first protrusion 260 may, for example, be slidably coupled to the body of the elongated member 120. The first protrusion 260 may extend (or protrude), for example, from a side surface of the second holding component 240 that is opposite to the second contact surface 243.

As illustrated in FIG. 1, the first protrusion 260 may include a curved member 263 (or arcuate member 263) that matches a shape of the first flange 152 and is configured to be moved along the first flange 152, and a pair of bar-shaped rails 268, 269 extending from opposite sides of the curved member 263. The bar-shaped rails 268, 269 are respectively configured to fit in the first and second grooves 156, 158 of the body of the elongated member 120. This configuration movably connects the first protrusion 260 with the body of the elongated member 120.

Since the first and second holding components 220 and 240 of the first holding assembly 200 are structurally connected to one another (e.g., via the first and second elastic members 252, 254), the first protrusion 260 of the second holding component 240 enables the entire first holding assembly 200 to be moved as a unit along the length of the body of the elongated member 120.

Referring to FIG. 1, the first protrusion 260 may include a first through opening 264. The first through opening 264 is configured to be moved on (or overlap with) the first plurality of notches 170 along the length of the body of the elongated member 120.

The first plunger assembly 290 is configured to extend through the first through opening and 264 to engage (e.g., contact) the first plurality of notches 170 to selectively affix the first holding assembly 200 to a desired location along the length of the body of the elongated member 120.

Referring to FIG. 1, the first plunger assembly 290 may include a first pin 292 configured to be selectively engaged with the first plurality of notches 170, a first handle 294 connected to the first pin 292 (e.g., via a first screw 296), and a fifth elastic member 298 (e.g., a coiled spring 298) configured to bias the first pin 292 toward body of the elongated member 120 such that the first pin 292 can engage any one of the first plurality of notches 170 to selectively affix the first holding assembly 200 to a desired location along the length of the body of the elongated member 120.

Figure 3A:
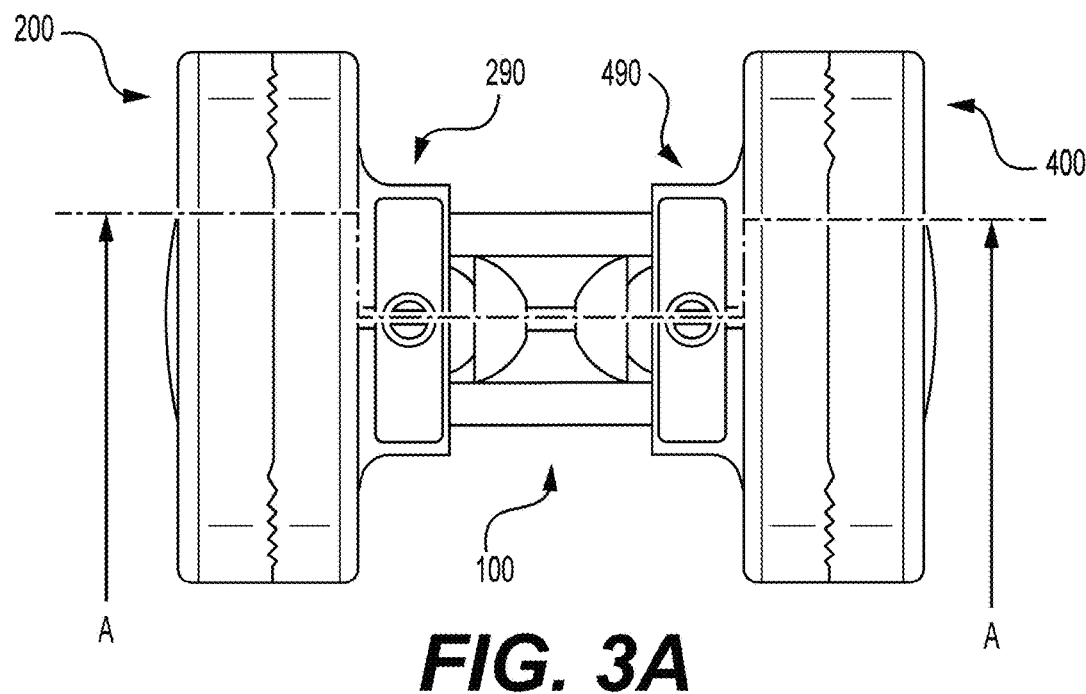
FIG. 3A is a top side view illustrating the dental apparatus of FIG. 1.
Figure 3B:
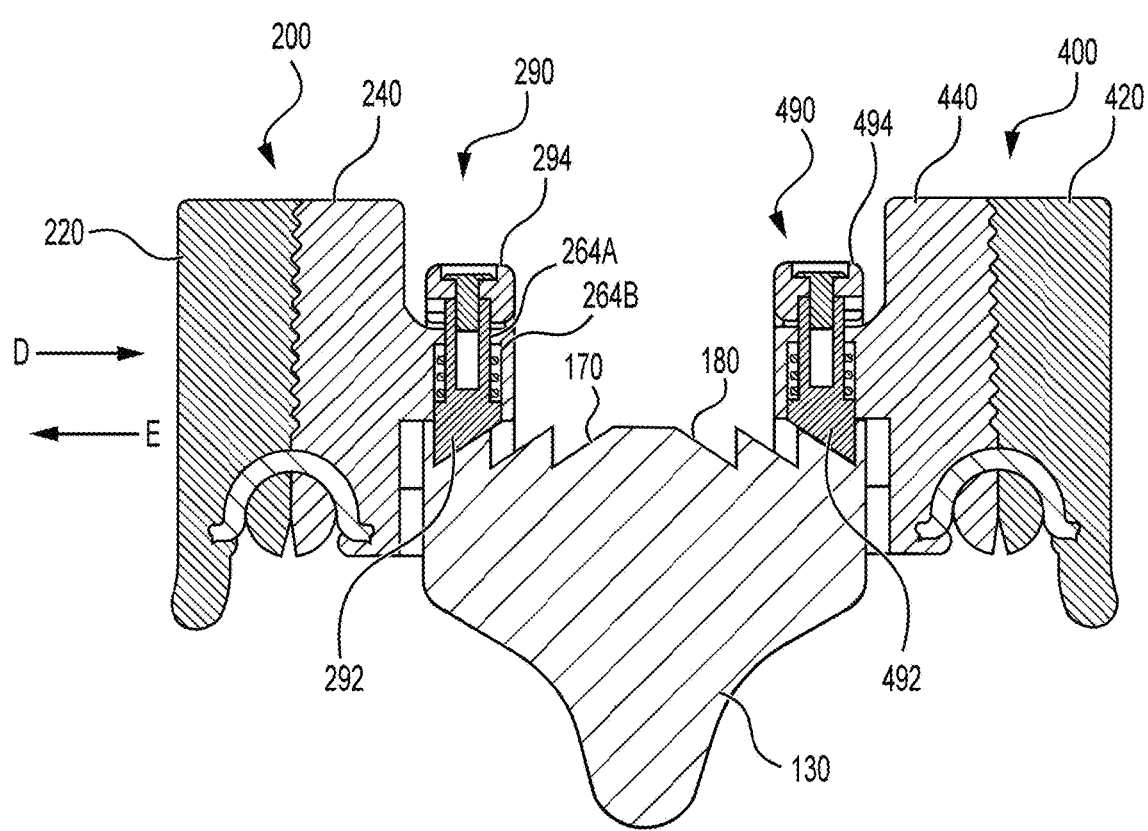
FIG. 3B is a cross-sectional view taken along line A-A of FIG. 3A.

As illustrated in FIG. 3B, the first through opening 264 may include a first chamber 264A having a first width, and a second chamber 264B having a second width, greater than the first width. The first and second chambers 264A, 264B may be in fluid communication with one another.

Referring to FIGS. 1 and 3B, the fifth elastic member 298 may be housed in the second chamber 264B to bias the first pin 292 toward the first plurality of notches 170 such that the first pin 292 can engage any one of the first plurality of notches 170. This configuration also enables the pin 292 to be disengaged from the first plurality of notches 170, for example, by pulling the first handle in a direction C (as shown in FIG. 6 for a second handle 494 of a second plunger assembly 490 of the second holding assembly 400) away from the body of the elongated member 120.

When the first pin 292 is disengaged from the first plurality of notches 170, the first holding assembly 200 can be moved in either direction along the body of the elongated member 120.

As illustrated in FIGS. 1 and 3B, the first pin 292 may have a tip with a V-like shape matching the V-like shape (and/or size) of the first plurality of notches 170. Due to the matching angle (or skewing) of the V-shape of the tip of the first pin and the V-shape of the first plurality of notches 170, the first holding assembly 200 can be moved toward the second holding assembly 400 by pushing the first holding assembly 200 in a direction D (see FIG. 3B) toward the second holding assembly 400 (e.g., the handle need not be lifted).

The V-shape of the tip of the first pin and the V-shape of the first plurality of notches 170, however, requires the first handle 294 to be lifted away from the body of the elongated member 120 (to disengage the first pin from the first plurality of notches 170) to move the first holding assembly 200 in a direction E (see FIG. 3B) away from the second holding assembly 400.

The first holding component 220, the second holding component 240, the first and second elastic members 252, 254 and the components 292-298 of the first plunger assembly 290 may include the same material(s) as the elongated member 120 and the third handle 130.

The first holding assembly 200 is described as including a pair of elastic members 252, 254 structurally connecting the first and second holding components 220, 240 to one another, to enable the first and second holding components 220, 240 to rotate relative to one another, and to bias the first and second holding components 220, 240 toward one another. However, this configuration is non-limiting.

For example, a single elastic member (e.g., the elastic member 252 or the elastic member 254) can be used to structurally to connect the first and second holding components 220, 240 to one another, to enable the first and second holding components 220, 240 to be rotated relative to one another, and to bias the first and second holding components 220, 240 toward one another. In another approach, more than two elastic members can be used to structurally connect the first and second holding components 220, 240 to one another, to enable the first and second holding components 220, 240 to be rotated relative to one another, and to bias the first and second holding components 220, 240 toward one another.

Alternatively, or in addition, a hinge mechanism (e.g., a hinge pin) can be used to rotatably couple the first and second holding components 220, 240 to one another.

The second holding assembly 400 may be a mirror duplicate of the first holding assembly 200. Therefore, components/parts of the second holding assembly 400 that are not described in detail in this specification and may be assumed to be the same as or similar to corresponding components/parts of the first holding assembly 200.

Referring to FIG. 1, the second holding assembly 400 may include a third holding component 420, a fourth holding component 440, third and fourth elastic members 452, 454 rotatably (or pivotally) coupling the third and fourth holding components 420, 440 to one another, and a second plunger assembly 490.

The third holding component 420, the fourth holding component 440, the third and fourth elastic members 452, 454 and the components 492-498 of the second plunger assembly 490 may include the same material(s) as the elongated member 120 and the third handle 130.

Referring to FIGS. 1 and 6, the third holding component 420 may include a third holding portion 422 having a third contact surface 423, a third handle 424 and a third coupling region 426 disposed between the third holding portion 422 and the third handle 424.

Referring to FIGS. 1 and 6, the fourth holding component 440 may include a fourth holding portion 442 having a fourth contact surface 443, a fourth coupling region 446 connected to the fourth holding portion 442, and a second protrusion 460 extending from the fourth holding portion 442 and/or the fourth coupling region 446.

The third and fourth elastic members 452, 454 may have the same configuration as the first and second elastic members 252, 254. In addition, the third and fourth coupling regions 426, 446 may each include a pair of elongated channels 427 (see FIG. 6, illustrating one of the channels 427) and 447 (see FIG. 1), similarly to the elongated channels 227, 247 of the first and second coupling regions 222, 242. This configuration enables the third and fourth elastic members 452, 454 to rotatably connect and bias the third and fourth holding components 420, 440 of the second holding assembly 400 toward one another (e.g., to bias the third and fourth contact surfaces 423, 443 toward one another) to hold a second piece of articulating paper 800, as illustrated in FIGS. 4A-4B, 5A-5B).

A user can insert the second piece of articulating paper 800 in between the third and fourth holding portions 422, 442 when the second holding assembly 400 is in the open state. See FIG. 5B. The user can then release the force applied to the third handle 424 in order to allow the spring force of the third and fourth elastic members 452, 454 to close the second holding assembly 400 and to secure the second piece of articulating paper between the third and fourth holding portions 422, 442. See FIGS. 4A-4B and 5A. As illustrated in FIG. 5A, the third contact surface 423 of the third holding portion 422 and the fourth contact surface 443 of the fourth holding portion 442 may each be grooved to provide a high level of friction (or grip) between the second holding assembly 400 and the second articulating paper 800.

The second protrusion 460 may extend from a side surface of the fourth holding component 440 that is opposite to the fourth contact surface 443.

The second protrusion 460 may be configured to be movably coupled to the body of the elongated member 120. For example, the second protrusion 460 may be configured to be slidably engaged to the body of the elongated member 120.

Referring to FIG. 1, the second protrusion 460 may include a second through opening 464. The second through opening 464 may be similar in configuration to the first through opening 264, and may be configured to be moved on (or overlap with) the second plurality of notches 180 along the length of the body of the elongated member 120.

The second plunger assembly 490 is configured to extend through the second through opening 464 and to engage (e.g., to make contact with) the second plurality of notches 180 to selectively affix the second holding assembly 400 to a desired location along the length of the body of the elongated member 120.

The second plunger assembly 490 may include a second pin 492 configured to be selectively engaged with the second plurality of notches 180, a second handle 494 connected to the second pin 492 (e.g., via a second screw 496) and a sixth elastic member 498 (e.g., a coiled spring 498) configured to bias the second pin 492 toward body of the elongated member 120 such that the second pin 494 can engage any one of the second plurality of notches 180 to selectively affix the second holding assembly 400 to a desired location along the length of the body of the elongated member 120.

The configuration of the second plurality of notches 180 and the configuration of the second plunger 490, respectively, may be the same or similar to the configuration of the first plurality of notches 170 and the configuration of the first plunger 290, but in a mirrored arrangement. Therefore, the second holding assembly 400 may be moved toward the first holding assembly 200 by pushing the second holding assembly 400 toward the first holding assembly 200. However, the second handle 494 must be pulled up to disengage the second pin 492 from the second plurality of notches 180 to move the second holding assembly 400 away from the first holding assembly 200.

This configuration enables one-hand adjustment of the separation distance between the first and second holding assemblies 200, 400 when desiring to move the first and second holding assemblies 200, 400 toward to one another.

The configuration of the first and second holding assemblies 200, 400 also allows for easy and convenient opening and closing of the first and second holding components 220, 240, and third and fourth holding component 420, 440. This is because the first and third holding components 220, 420 (which have the first and third handles 224, 424) are located at the outer limit (or on the outer sides or outer ends) of the dental apparatus 1000 (with the second and fourth holding components 240, 440, as a group, being disposed between the first and third holding components 220, 420), and the first and third handles 224, 424 are configured to be rotated toward one another (or inwardly) as illustrated by arrows F, G on FIG. 5B to open both of the first and second holding assemblies 200, 400. This configuration enables a user's hand to easily squeeze (or press) the first and third handles 224, 424 toward one another as illustrated by arrows F, G on FIG. 5B (which is an intuitive and convenient gesture) to open the first and second holding assemblies 200, 400.

Alternatively, if the user desires to open only one of the first and second holding assemblies 200, 400 (e.g., to load an articulating paper therein or to remove a used articulating paper therefrom), the user may, for example, rest the thumb of one of the user's hands on the third handle 130 of the elongated member 120 of the central component 100 for support, and use the index finger and/or another finger of the same hand to press the first handle 224 inwardly as illustrated by arrows B, B on FIG. 5A (or toward the second holding assembly 400) when desiring to open the first holding assembly 200, or to press the third handle 424 inwardly (or toward the first holding assembly 200) when desiring to open the second holding assembly 400. Accordingly, the configuration of the dental apparatus 1000 of the present disclosure enables one-handed opening and closing of either one or both of the first and second holding assemblies 200, 400.

Figure 4A:
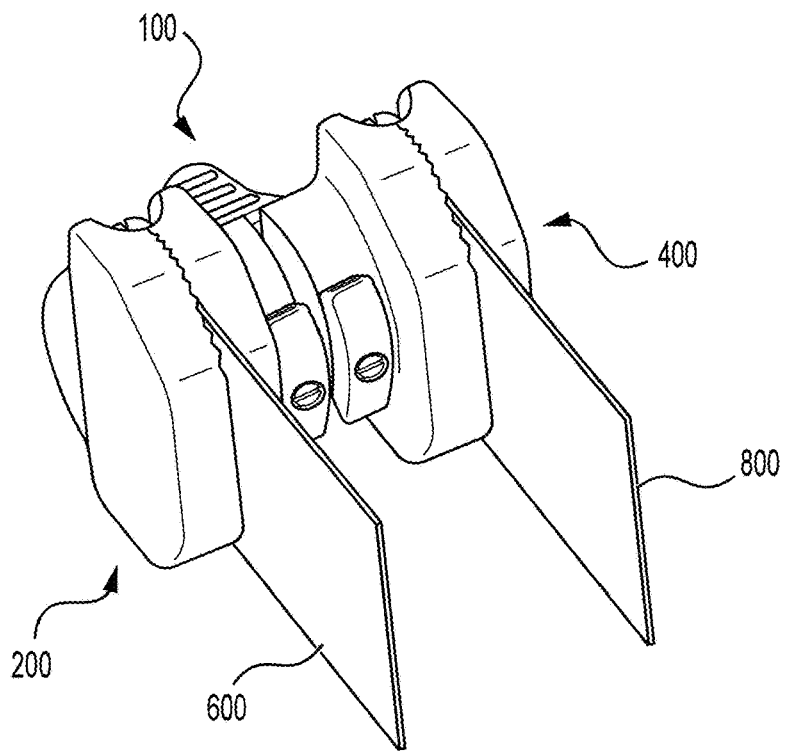
FIG. 4A is a perspective view illustrating the dental apparatus of FIG. 1 loaded with articulating paper.
Figure 4B:
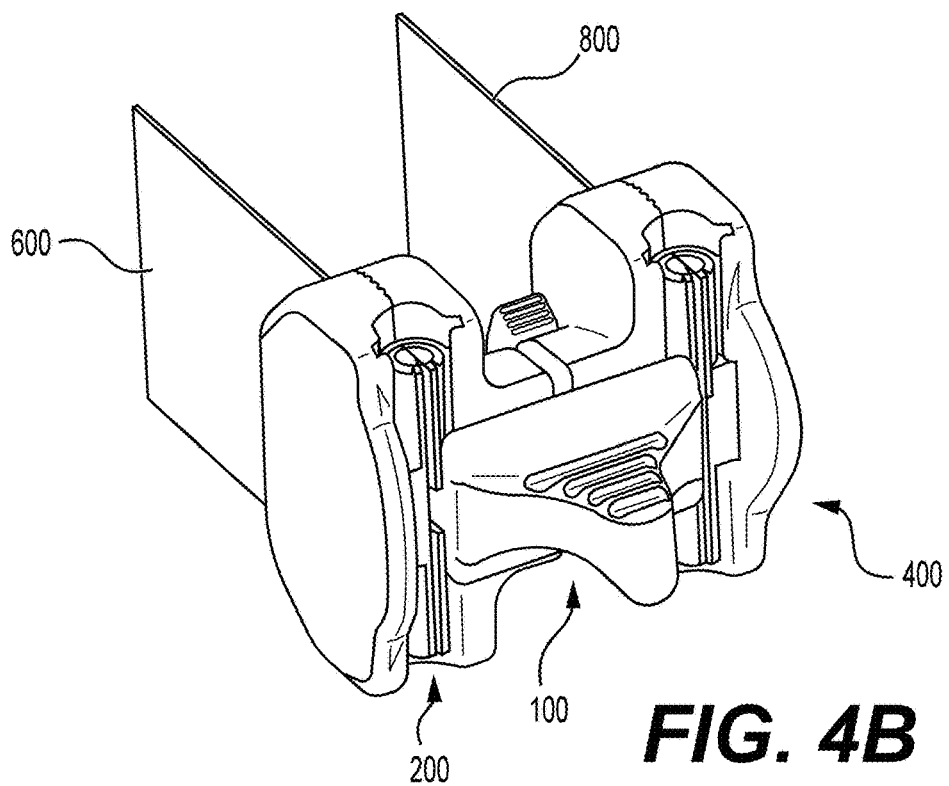
FIG. 4B is a perspective view illustrating the dental apparatus of FIG. 1 loaded with articulating paper.

In addition, when both of the first and second holding assemblies 200, 400 are loaded with articulating paper (as illustrated in FIGS. 4A, 4B), the user needs to utilize only one hand to hold the dental apparatus 1000 of the present disclosure and to insert or remove the dental apparatus 1000 into a patient's mouth, as the case may be, to determine the fit of a prosthetic dental crown at the interproximal contact areas between the crown and its adjacent teeth. For example, the user can hold the dental apparatus 1000 by holding the third handle 130 of the elongated member 120 of the central component 100 with two or more fingers of the same hand.

This configuration enables a user to determine the fit of a crown at both interproximal contact areas between the crown and its adjacent teeth simultaneously while needing only one hand to hold the apparatus 1000 with two articulating papers at the site where the crown will be installed.

In addition, the configuration of the apparatus 1000 of the present disclosure enables for a rapid adjustment of the separation distance between the first and second holding assemblies 200, 400. Either one of the first and second holding assemblies 200, 400 can be slid toward the other holding assembly (from among the group consisting of the first and second holding assemblies 200, 400) by using only one hand. In addition, both the first and second holding assemblies 200, 400 can be slid toward one another by using one hand.

This configuration enables a rapid and accurate trial and adjustment of a dental crown prior to its cementation, in turn, enabling a dentist to increase efficiency and to save the patients' time.

A method of operating a dental apparatus 1000 of the present disclosure may include obtaining the dental apparatus 1000, loading the obtained dental apparatus 1000 with first and second articulating papers 600, 800, inserting the dental apparatus 1000 with the first and second articulating papers 600, 800 loaded thereon into the patient's mouth to determine the fit of the prosthetic crown (with the first and second articulating papers 600, 800, respectively, being disposed at the interproximal contact areas of the prosthetic crown and its adjacent teeth), and inserting the prosthetic crown at the site where it will be installed (e.g., where the crown will be cemented to a prepared tooth base or installed on an osseointegrated dental implant), in between the first and second articulating papers 600, 800.

The loading of the dental apparatus 1000 with the first articulating 600 paper may include pivoting open the first and second holding components 220, 240 by overcoming the bias of the first and/or second elastic member(s) 252, 254, inserting the first articulating paper 600 between the first and second holding components 220, 240, and allowing the first and/or second elastic member(s) 252, 254 to pivot the first and second holding components 220, 240 toward one another such that the first and second holding components 220, 240 can grip and hold the first articulating paper 600.

The loading of the dental apparatus 1000 with the second articulating paper 800 may include pivoting open the third and/or fourth holding components 420, 440 by overcoming the bias of the third and/or fourth elastic member(s) 452, 454, inserting the second articulating paper 800 between the third and fourth holding components 420, 440, and allowing the third and/or fourth elastic member(s) 452, 454 to pivot the third and fourth holding components 420, 440 toward one another such that the third and fourth holding components 420, 440 can grip and hold the second articulating paper 800.

The method may also include adjusting the separation distance between the first and second holding assemblies 200, 400 to separate the first and second articulating papers 600, 800 by the gap (or spacing) between the teeth where the prosthetic crown will be installed.

The technique includes placing the prosthetic crown between the first and second articulating paper(s) 600, 800, pushing the crown toward the prepared tooth, pulling the articulating papers, observing for any heavy markings caused by the first and/or second articulating paper(s) 600, 800; and adjusting the crown based on the observation. The adjustment may include, for example, grinding the crown at the location of the markings to ensure natural contact between the crown and its adjacent teeth.

The method steps described above may then be repeated to re-evaluate the fit of the crown until the user of the apparatus 1000 and the patient are satisfied with the fit.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. A dental apparatus, comprising:
   a central component, the central component including an elongated member having a first end, a second end, and a body extending between the first and second ends thereof;
   a first holding assembly movably coupled to one of the first end or the second end; and
   a second holding assembly movably coupled to the other of the first end or the second end,
   wherein each one of the first and second holding assemblies is configured to releasably hold dental articulating paper,
   wherein the first holding assembly includes a first holding component and a second holding component pivotally coupled to the first holding component,
   wherein the first holding assembly further includes a first elastic member pivotally coupling the first and second holding components to one another, wherein the first elastic member is configured to bias the first and second holding components toward one another such that the bias of the first elastic member can cause the first and second holding components to hold a first dental articulating paper therebetween when the first dental articulating paper is disposed between the first and second holding components,
   wherein the first holding component includes a first holding portion, a first handle and a first coupling region disposed between the first holding portion and the first handle,
   wherein the second holding component includes a second holding portion and a second coupling region,
   wherein the first elastic member is connected to the first coupling region and to the second coupling region,
   wherein the body of the elongated member includes a first plurality of notches sequentially arranged along a length thereof, and
   wherein the first holding assembly further includes a first plunger assembly connected to the second holding component, wherein the first plunger assembly is configured to selectively engage the first plurality of notches to selectively affix the first holding assembly at different locations along the length of the body of the elongated member.

2. The dental apparatus of claim 1, wherein the second holding component includes a first protrusion movably coupling the second holding component to the body of the elongated member, and
   wherein the first plunger assembly extends through a through opening in the first protrusion.

3. The dental apparatus of claim 2, wherein the first plunger assembly includes a first pin configured to be selectively engaged with the first plurality of notches, a first handle connected to the first pin, and a third elastic member configured to bias the first pin toward the body of the elongated member such that the first pin can engage any one of the first plurality of notches.

4. The dental apparatus of claim 3, wherein each notch of the first plurality of notches has a V-shape and the pin has a tip with a matching V-shape.

5. The dental apparatus of claim 4, wherein the first plurality of notches is disposed adjacent to the first end of the first end body of the elongated member, and
   wherein the V-shape of each notch of the first plurality of notches is inclined in a direction away from the first end of the body of the elongated member, enabling the first holding assembly to be moved toward the second end of the body of the elongated member by pushing the first holding assembly toward the second end of the body of the elongated member, but preventing the first holding assembly from being moved toward the first end of the body of the elongated member without pulling the first handle away from the body of the elongated member.

6. The dental apparatus of claim 1, further comprising a handle connected to the body of the elongated member between the first and second ends thereof.

7. The dental apparatus of claim 1, wherein the second holding assembly includes a third holding component and a fourth holding component pivotally coupled to the third holding component.

8. The dental apparatus of claim 7, wherein the second holding assembly further includes a second elastic member pivotally coupling the third and fourth holding components to one another, wherein the second elastic member is configured to bias the third and fourth holding components toward one another such that the bias of the second elastic member can cause the third and fourth holding components to hold a second dental articulating paper therebetween when the second dental articulating paper is disposed between the third and fourth holding components.

9. The dental apparatus of claim 8, wherein the third holding component includes a third holding portion, a second handle and a third coupling region disposed between the third holding portion and the second handle,
wherein the fourth holding component includes a fourth holding portion and a fourth coupling region, and
wherein the second elastic member is connected to the third coupling region and to the fourth coupling region.

10. The dental apparatus of claim 9, wherein the body of the elongated member further includes a second plurality of notches sequentially arranged along a length thereof, and
wherein the second holding assembly further includes a second plunger assembly connected to the fourth holding component, wherein the second plunger assembly is configured to selectively engage the second plurality of notches to selectively affix the second holding assembly at different locations along the length of the body of the elongated member.

11. The dental apparatus of claim 10, wherein the fourth holding component includes a second protrusion movably coupling the fourth holding component to the body of the elongated member, and
wherein the second plunger assembly extends through a through opening in the second protrusion.

12. The dental apparatus of claim 11, wherein the second plunger assembly includes a second pin configured to be selectively engaged with the second plurality of notches, a second handle connected to the second pin, and a fourth elastic member configured to bias the second pin toward the body of the elongated member such that the second pin can engage any one of the second plurality of notches.

13. The dental apparatus of claim 9, wherein the first holding component includes a first holding portion, a first handle and a first coupling region disposed between the first holding portion and the first handle,
wherein the second holding components includes a second holding portion and a second coupling region,
wherein the first holding assembly further includes a first elastic member connected to the first and second coupling regions, the first elastic member being configured to bias the first and second holding portions toward one another,
wherein the second and fourth holding components, as a group, are disposed between the first and third holding components,
wherein the first handle is configured to be rotated toward the second handle to selectively open the first holding assembly, and
wherein the second handle is configured to be rotated toward the first handle to selectively open the second holding assembly.

14. A dental apparatus, comprising:
a central component, the central component including an elongated member having a first end, a second end, and a body extending between the first and second ends thereof;
a first holding assembly movably coupled to one of the first end or the second end; and
a second holding assembly movably coupled to the other of the first end or the second end,
wherein each one of the first and second holding assemblies is configured to releasably hold dental articulating paper,
wherein the first holding assembly includes a first holding component and a second holding component pivotally coupled to the first holding component,
wherein the second holding assembly includes a third holding component and a fourth holding component pivotally coupled to the third holding component,
wherein the second holding assembly further includes a second elastic member pivotally coupling the third and fourth holding components to one another, wherein the second elastic member is configured to bias the third and fourth holding components toward one another such that the bias of the second elastic member can cause the third and fourth holding components to hold a second dental articulating paper therebetween when the second dental articulating paper is disposed between the third and fourth holding components,
wherein the third holding component includes a third holding portion, a second handle and a third coupling region disposed between the third holding portion and the second handle,
wherein the fourth holding component includes a fourth holding portion and a fourth coupling region,
wherein the second elastic member is connected to the third coupling region and to the fourth coupling region,
wherein the body of the elongated member further includes a second plurality of notches sequentially arranged along a length thereof, and
wherein the second holding assembly further includes a second plunger assembly connected to the fourth holding component, wherein the second plunger assembly is configured to selectively engage the second plurality of notches to selectively affix the second holding assembly at different locations along the length of the body of the elongated member.

* * * * *